United States Patent [19]

Kraig et al.

[11] Patent Number: 4,515,822
[45] Date of Patent: May 7, 1985

[54] HOLLOW, PUFFED FRUIT PRODUCTS AND METHODS OF PREPARATION

[75] Inventors: Leon Kraig, Plymouth; Mathew Langenfeld, Eagan, both of Minn.

[73] Assignee: General Mills, Inc., Minneapolis, Minn.

[21] Appl. No.: 526,942

[22] Filed: Aug. 29, 1983

[51] Int. Cl.$^3$ ............................ A23L 1/04; A23L 1/18
[52] U.S. Cl. .................................. 426/445; 426/276; 426/625; 426/640
[58] Field of Search ............... 426/276, 102, 640, 577, 426/625, 445, 450, 451

[56] References Cited

U.S. PATENT DOCUMENTS

| | | | |
|---|---|---|---|
| 3,015,128 | 1/1962 | Somerville | 425/5 |
| 3,362,831 | 1/1968 | Szczesniak | 426/575 |
| 3,833,747 | 9/1974 | Cording et al. | 426/465 |
| 3,892,870 | 7/1975 | Wood | 426/575 |
| 3,922,360 | 11/1975 | Sneath | 426/573 |
| 4,055,675 | 10/1977 | Popper et al. | 426/465 |
| 4,103,035 | 7/1978 | Fulger et al. | 426/640 |
| 4,117,172 | 9/1978 | Bradshaw et al. | 426/573 |
| 4,119,739 | 10/1978 | Barwick et al. | 426/573 |
| 4,127,947 | 12/1978 | Webb et al. | 34/92 |
| 4,256,772 | 3/1981 | Shanbhag et al. | 426/331 |

FOREIGN PATENT DOCUMENTS 1302275  1/1973  United Kingdom ............... 426/102

*Primary Examiner*—George Yeung
*Attorney, Agent, or Firm*—Gene O. Enockson; John A. O'Toole

[57] ABSTRACT

Disclosed are simulated, puffed dried fruit pieces and methods for their preparation. The dried fruit pieces are useful for incorporation into ready-to-eat cereals of low water activity, e.g., $A_w$ of 0.1 to 0.3, such as puffed cereals. The dried fruit pieces are characterized by a low density ranging from 0.15 to 0.40 g./cc. due in part to a hollow center and thus do not settle during distribution and storage, and do not sink in milk. The dried fruit pieces are prepared by drying in prescribed manner pieces comprising encapsulated solutions containing hydrophilic colloids set with gelling agents.

16 Claims, No Drawings

HOLLOW, PUFFED FRUIT PRODUCTS AND METHODS OF PREPARATION

FIELD OF THE INVENTION

The present invention relates to food products and to their method of preparation. More particularly, the present invention relates to fruit products or simulated fruit products, particularly dried fruit products suitable for inclusion with ready-to-eat cereals, and to their methods of preparation.

THE PRIOR ART

Ready-To-Eat cereals are popular food items and are available in a wide variety of shapes, sizes, textures, flavors, ingredients, etc. Among the popular varieties which are available are those which are relatively light in density, i.e., 0.05 to 0.25 g./cc., and are often referred to as puffed. Also popular are R-T-E cereals which contain fruit or which are fruit flavored. Of course then, it would be desirable to provide puffed R-T-E cereals with fruit. However, in addition to the problems generally of providing R-T-E cereals containing fruit or fruit products, certain additional problems are particular to combinations of puffed R-T-E cereals and fruit.

The problems of generally providing R-T-E cereals containing fruit revolve around the necessity of providing dried fruit products of roughly comparable water activity (or "$A_w$") as dried R-T-E cereals in order to prevent moisture migration to the cereal during storage and the staling of crisp cereal texture of the cereals resulting therefrom. Such drying of the fruit or fruit products typically result in unacceptable toughening of the fruit texture. Numerous art attempts have then been made to modify the texture of dried fruits or to provide fruits infused with humectants to provide soft texture fruits. (See, for example, U.S. Pat. No. 4,256,772, issued Mar. 17, 1981 to S. Shambhag et al.; U.S. Pat. No. 4,103,035, issued July 25, 1978 to C. Gulger et al.).

However, notwithstanding any general teaching that these various dried fruit products can be used with any form of R-T-E cereal, in actual practice, dried fruits have only successfully been used with flake or shredded R-T-E cereals. The reason for this is that only flake or shredded R-T-E cereals remain crisp at "relatively" higher $A_w$'s. Thus, for example, flake cereals have $A_w$'s of about 0.5. Other cereal forms, particularly puffed, must be maintained at lower $A_w$'s, i.e., 0.1 to 0.3 in order to maintain crispness. In short, while flake R-T-E cereals are "dry," flake cereals are not nearly as "dry" as other R-T-E cereal forms. At these very low water activity levels, dried fruit products produced by prior art techniques are unacceptably hard in texture even though they would be acceptable at higher $A_w$'s compatible with flake cereals. Of course, if more tender dried real or simulated fruit pieces having higher $A_w$'s are added to puffed cereals, moisture migration to the more dry puffed cereal causes deterioration in cereal crispness.

The problems specific to providing puffed R-T-E cereals with fruit pieces include further problems stemming from differences in density. During storage, the relatively heavier dried fruit pieces of the prior art tend to settle or stratify at the bottom of the cereal carton or container. Additionally, during consumption when milk is added, the puffed cereal pieces float while fruit is "lost," i.e., sinks out of sight in the milk.

One solution to the above problems has been simply to flavor and color puffed R-T-E cereal pieces with artificial fruit flavor and color, e.g., TRIX®, BOOO BERRY® and STRAWBERRY SHORTCAKE® brands of puffed cereal.

The present invention surprisingly provides novel solutions to the above problems. In part, the present invention provides novel, dried, simulated fruit or fruit products which are also puffed, and thus compatible with puffed R-T-E cereals both with regard to $A_w$ and density. The present products are prepared by setting a solution containing a hydrophilic colloid with a gelling agent, and drying in a prescribed manner.

The prior art, of course, includes a variety of artificial or simulated fruits based upon the technique of gel setting a solution containing a hydrophilic colloid. Early efforts such as British Pat. Nos. 556,718 and 727,475, as well as U.S. Pat. No. 3,362,831 (issued Jan. 9, 1968 to A. S. Szczeniak) disclose that imitation soft fruit can be prepared by encompassing a solution of flavoring and sodium alginate with a calcium solution. However, the process eventually yielded products with a gum drop consistency throughout since the whole droplet contained the material capable of being set up (alginate) and the gelling agent (calcium) continued to penetrate the interior. The process of U.S. Pat. No. 3,682,654 (issued Aug. 8, 1972 to E. W. Johnson) thus disclosed a process reversing the solutions, i.e., providing a calcium or gelling agent solution which has an exterior film or skin formed by reacting with an alginate bath.

Subsequent improvements include refinements in suitable apparatus for practicing this method. (See, U.S. Pat. No. 3,922,360, issued Nov. 25, 1975 to M. E. Sneath and U.S. Pat. No. 4,127,947, issued Dec. 5, 1978 to W. A. Webb.) Also, U.S. Pat. No. 4,117,172 (issued Sept. 26, 1978 to N. J. Bradshaw et al.) provides processes for multi-textured simulated fruits.

The prior art also includes puffed real fruit products, e.g., raisins employing liquid carbon dioxide, (see U.S. Pat. No. 4,055,675, issued Oct. 25, 1977 to Popper) which are taught as crisp on the exterior and suitable combination with cereals. Another technique for puffed fruit is disclosed in U.S. Pat. No. 3,833,747 (issued Sept. 3, 1974 to J. Cording).

Notwithstanding these numerous prior art effects, the present invention surprisingly provides novel food product articles simulating fruit which are especially light (i.e., low density) due also to having a novel hollow interior feature and thus are especially useful for combination with puffed R-T-E cereals. Such combined cereal and fruit piece products are not subject to segregation due to density differences, storage problems due to $A_w$ differences, or fruit sinkage problems upon consumption with milk.

SUMMARY OF THE INVENTION

The present invention relates to simulated, dried, puffed fruit pieces which have a hollow center feature. The fruit pieces are soft at $A_w$'s of 0.1 to 0.3. The pieces are especially useful for incorporation with puffed R-T-E cereals.

The pieces essentially comprise a shell comprising a gel or sol of a hydrophilic colloid set with gelling agents. The pieces further essentially comprise (dry basis) 1 to 60% nutritive carbohydrate sweeteners, and 0.1 to 12% of flavor and color.

In its method aspect, the present invention relates to processes for the preparation of novel forms of simulated fruit pieces. The present processes essentially comprise in sequence, the steps of (A) forming wet encapsulated simulated fruit pieces, (B) first drying the pieces, and (C) finish drying the pieces.

The present invention also provides R-T-E cereals comprising about 1 to 50% of the present fruit pieces.

DETAILED DESCRIPTION OF THE INVENTION

The present invention relates to puffed, dried simulated fruit pieces and to their methods of preparation. The fruit pieces are prepared by preparing pieces of encapsulated simulated fruit pieces and drying in prescribed manner. Product composition, attributes and use as well as the product preparation steps are described in detail as follows.

Throughout the specification and claims, percentages and ratios are by weight, and temperatures in degrees Fahrenheit, unless otherwise indicated.

A. Forming Wet Simulated Fruit Pieces

In the present method of preparation, the first essential step is to form wet encapsulated simulated fruit pieces. This formation step employs well known principles of gel formation based upon setting up solutions of gel forming hydrophilic colloid to form a gel or sol. Generally, at least two solutions are used, one contains the hydrophilic colloid while the second contains the gelling agent. As noted above, the recent art practice has been to have the solution containing the gelling agent as the interior or to-be-encapsulated solution. Drops or pieces of the encapsulant solution are formed, e.g., by freezing in suitable shaped molds, and are placed in a bath of hydrophilic colloid. The sol formation reaction occurs about the exterior of the pieces to form a skin. Thereafter, the pieces are removed from the bath of hydrophilic colloid and finish set by immersion into a second bath comprising a gelling agent to set residual amounts of adhering hydrophilic colloid.

In the present procedure, however, the solution comprising the interior solution or encapsulant of the pieces is reversed. In the present methods, it is the encapsulant solution which comprises the gel forming hydrophilic colloid and which is set by reaction with a bath containing the gelling agent. In preferred embodiments, the encapsulant solution is extruded directly into the bath from dies submerged in the bath of gelling agent. The dies can be of any desired shape to form desired sized and shaped pieces. Typically, a cutting means is used to cut the extrudate into desired length or size pieces.

Any of the commonly available gel forming hydrophilic colloids can be used and the skilled artisan will have no problem selecting suitable materials for use herein. Preferred for use herein as hydrophilic colloids are alginates, e.g., sodium, low methoxyl pectin, iota carrageenan, kappa carrageenan and mixtures thereof. The hydrophilic colloid is used in an amount sufficient to provide the desired encasement or skin for the wet pieces of the present invention. Preferably, the hydrophilic colloid will be present in the first solution at about 0.1 to 8% by weight.

Any flavoring can be used in the solution to be encased. Thus the same may contain sugar(s), e.g., sucrose, glycerol, sorbital, fructose, corn syrup, especially high fructose corn syrup, artificial sweeteners, e.g., saccharin and/or aspartame, natural or artificial food flavors, e.g., mint, chocolate, cheese, root beer, and the like. Especially preferred are fruit flavors such as citrus flavors, orange and lemon and berry flavors, e.g., strawberry, raspberry, and blackberry.

The first or encapsulant solution may also contain coloring agents, mold inhibitors, thickeners, flavor intensifiers, plasticizers, fruit puree, fruit pulp (i.e., dejuiced fruit puree) fruit juice, or even modest amounts, e.g., 0.1 to 20% of peanut butter, vegetable puree or cheese and the like. One preferred mold inhibitor is potassium sorbate. Preferred thickeners are pregelatinized starches and CMC (carboxymethyl cellulose). One often desirable flavor intensifier is citric acid, especially when the berries are to simulate natural fruits. Glycerine is the preferred plasticizer and also functions as a humectant.

The second solution contains a gel setting agent capable of causing the hydrophilic colloid in the first solution to set up and form a skin around portions or droplets of the first solution. Any of a wide variety of gel setting agents can be used depending on the particular hydrophilic colloid used in the second solution. Preferred such agents for use with low methoxyl pectin, sodium alginate and similar hydrophilic colloids are water soluble polyvalent metal salts such as the phosphates, sulfates, fluconates, chlorides and carbonates of calcium, aluminum and the like. Calcium is the preferred metallic ion and dicalcium phosphate is advantageously employed. Where the hydrophilic colloid is kappa type carrageenan and the like, the gel setting agent may preferably be a potassium salt such as potassium chloride. The gel setting agent will be present in the solution to be encased in an amount sufficient to provide enough gel setting capability to form an essentially continuous film or skin on the surface of portions or droplets of the solution when encompassed by the hydrophilic colloid solution. Preferably, the first solution will contain from about 0.25 to 5.0% by weight of the gel setting agent.

The gel setting solution can also conveniently contain an edible organic acid, e.g., citric acid, malic acid and the like. Such acids desirably give the finished product tartness in flavor as well as enhancing certain flavors, especially citrus and grape flavors. Were the acid added to the encapsulant solution, the lowered pH might adversely result in the precipitation of the hydrophilic colloid, especially alginates precipitated as alginic acid, leading to loss or reduction in gel strength and thus possible inability to form the present wet encapsulated pieces.

Any procedure whereby portions of the first solution are brought into contact with and encompassed by the second solution may be used in this invention. Thus, in a very simple aspect, drops of the first solution may be dropped from any common dropper into the second solution. Of course, more sophisticated pieces of apparatus may be employed such as that described in British Pat. No. 727,475. The preferred technique is to directly extrude the encapsulant into the bath using a submerged nozzle or die head or other orifice submerged in the bath. Depending on the skin thickness desired, the encased portions or droplets may be allowed to remain immersed in the second solution for varying periods of time. The only necessity is that the skin be essentially continuous and of sufficient strength to allow removal of the artificial flavored pieces from the second solution. Preferred contact-encompassing times are from between about 1 to 40 minutes. It is especially preferred that such time period be in the range of from about 15 to 20 minutes. The temperature of the solutions is also not critical. However, it is preferred that the encapsulant solution or slurry range from 60° to 90° F., (15° to 32° C.) to maintain fluidity while minimizing flavor loss, while the gelling agent bath or solution desirably ranges from 45° to 60° F., (7° to 15° C.).

Another preferred ingredient for the encapsulant solution is an edible fatty triglyceride oil, e.g., soybean, cottonseed, and coconut oil. Any other common oil or mixtures thereof can be used at from 0 to 30%, preferably 5 to 7% of the encapsulant solution. Such oils also plasticize the finished fruit piece texture. Excessive oil amounts, however, can give an undesirable oily flavor and mouthfeel to the finished fruit pieces. If oil is added to the encapsulant solution, a conventional food grade emulsifier should be employed such as polyoxythelyne sorbiton fatty acid esters, glycerol partial esters, or propylene glycol and sorbitol partial esters, at levels ranging from 0.1 to 6% (wet basis) to disperse and suspend the oil throughout the solution.

Optionally, the encapsulant solution may contain real fruit materials such as fruit juice (single strength or multiple strength) juice powders and/or fruit puree(s) or pulp. Of course, depending upon the material(s) employed, these materials will contribute moisture, flavor, color and sweeteners.

In one preferred embodiment the encapsulant solution is strawberry fruit puree, at levels ranging from 5 to 40% on a wet basis and a suitable hydrophilic colloid.

B. Drying

Immediately after withdrawal from the bath of gelling agent, the pieces are dehydrated from an initial moisture content of about 35+% moisture to about 1 to 25%. In a preferred embodiment, the drying involves a two-step procedure. In the first step, the pieces are essentially dried to about 20±10%. It is essential that the first drying step be practiced employing forced hot air convection of high temperature. The air temperatures essentially range between about 220° to 280° F. (104.4° to 137.7° C.). High air temperatures are important to the realization of pieces which are hollow cored and puffed. That is, under more moderate drying conditions, pieces which do not have hollow cores are realized. While not wishing to be bound to the proposed theory, it is speculated herein that at lower temperatures insufficient steam pressure exists to cause expansion and the creation of hollow centers. Excessive temperatures, however, are also to be avoided since such temperatures can lead to the rupturing of the pieces. Such rupturing, of course, results in unacceptable pieces due to their loss of buoyancy in milk as well as their aesthetic appeal.

One highly preferred embodiment employs both high temperatures and high turbulence during the initial drying. For the purposes herein, "turbulent" is meant to include air velocities of at least about 8,000 ft./sec. (2,500 m./s.). In more preferred embodiments, the air flow vector is downward relative to the pieces although other air flow vector orientations can also be used. High turbulent heating not only dries the pieces more quickly but also aids the formation of the hollow center feature of the present products.

Commercial equipment to practice the first essential drying step is readily available. For example, a Jet Zone ™ fluidized bed drier manufactured by Wolverine Corp. can be used. In such equipment the pieces are dried to about 20% moisture in about 45 minutes although time is not a critical parameter. Tray drying, i.e., hot air convection drying can also be used. However, drying times are substantially increased. Also, lower density fruit pieces are more difficult to obtain.

It is during this first, high temperature drying step that the essential hollow center feature of the present pieces is created. Also, the skin or shell element of the pieces is partially puffed. Thereafter, the pieces so formed can be finish dried in a second step. Any conventional dehydration technique can be used to finish dry the pieces to final moisture contents ranging from about 5% to 10%. Conventional hot air convection drying is the preferred technique for the second drying step. Drying temperatures can range from 160° to 250° F., (71° to 121° C.). If desired, the second step can be practiced using the same drying apparatus, technique and conditions as the initial drying step.

Of course, the precise desired finish moisture content will depend upon several factors, principally the desired $A_w$ and the composition of the pieces. Of course, while certain embodiments of the present pieces having $A_w$'s ranging from 0.1 to 0.3 are especially suitable for use with puffed R-T-E cereals, other embodiments having higher water activities can be prepared, e.g., 0.3 to 0.5 for inclusion with high moisture activity cereals such as flake or shredded.

The preferred pieces so prepared are generally spherical and range in size from about 8 to 12 mm. in diameter although both larger and smaller pieces can also be prepared. The pieces have a shell portion which generally is about 1 mm. thick and a hollow core about 6 to 10 mm. in size. Additionally, other shaped pieces, e.g., triangles, figurines can be prepared using appropriate dies during the extrusion or formation step. Pieces of varying texture from chewy to friable can be prepared depending upon compositional variation. The bite of the pieces, even the friable embodiments, are perceived as more tender in part due to the present hollow feature.

The simulated, puffed pieces prepared by the present invention can be used in various ways. For example, the dried fruit pieces can be consumed by themselves as a snack item or in combination with other items, e.g., granola, nuts, etc. The fruit pieces can be added to both dry or instant dry cereals, e.g., oatmeal, which are dry packaged. Preferred embodiments of the dried fruit pieces find particular usefulness as a component of dried, puffed R-T-E cereals and are characterized by an $A_w$ of about 0.1 to 0.3. Even more preferred embodiments are those which additionally match the density of puffed R-T-E cereals, i.e., pieces of the present invention having preferred densities of 0.15 to 0.25 g./cc.

The present dried, puffed fruit pieces have a remarkable extended storage stability while maintaining their desirable texture, color and appearance as compared to conventional dried fruit products. Still another advantage of the present fruit pieces is that they remain soft even at freezer temperatures.

The R-T-E cereals with which the present dried fruit products can be combined include all R-T-E cereal particles whether or not pre-sweetened in flaked, shredded, expanded, or other forms, such as wheat flakes, corn flakes, shredded wheat, puffed wheat, rice, oat, or corn, bran flakes, whole bran cereal, breakfast cereals in the form of extruded and puffed doughs, and the like. Such cereal particles are prepared in conventional manner and may be either toasted or untoasted. The fruit pieces can comprise about 1 to 50% of the simulated fruit and cereal products.

Another advantage of the present puffed fruit pieces is a minimization of toughness perception by virtue of the hollow center feature. Even for larger pieces, e.g., about 15 mm. in diameter, at low $A_w$'s, e.g., below 0.3, the "bite" is not tough since only the shell is bitten through.

By modest manipulation of the composition of the present pieces, embodiments can be realized which are relatively more chewy, i.e., by using plasticizers, especially vegetable oils, and by using corn syrup sweeteners or glycerine at higher levels. Conversely, if desired, pieces can be realized which are friable but which are still not tough by using crystallizable ingredients, such as sucrose and/or low D.E. corn syrup.

Still another benefit of the present invention is the realization of flake or shredded cereal products containing simulated fruit pieces wherein the cereal pieces are especially crisp and/or resistant to staling. Since the present fruit pieces can be prepared with $A_w$'s of about 0.2 to 0.3, the cereal pieces can be dried to such lower $A_w$'s to realize the crispness and anti-staling benefits provided herein without adversely affecting fruit piece textures.

The following examples are included for illustrative purposes only and are not intended to limit the scope of the invention.

EXAMPLE 1

Dried simulated strawberry fruit pieces of the present invention having a brittle texture are prepared according to the following bench scale procedure.

Two hundred grams of an encapsulant slurry is prepared having the following formulation:

| Ingredient | Weight % |
|---|---|
| Strawberry puree (90% moisture) | 16.93 |
| Orange pulp (92% moisture) | 7.92 |
| Distilled water | 35.19 |
| Corn syrup, high fructose | 17.59 |
| Sucrose | 2.99 |
| Sodium alginate | 1.00 |
| Sodium pyrophosphate | 0.30 |
| Ethyl maltol (flavor enhancer) | 0.05 |
| Red dye | 0.13 |
| Strawberry flavor | 3.99 |
| Vegetable oil | 2.00 |
| Polysorbate 60 | 1.13 |
| Maltodextrin | 11.66 |
| | 100.00% |

The encapsulant is extruded from a cookie gun and cut and formed into 8 mm. spheres. The spheres are placed in a pan containing a bath having the following formulation for about 20 minutes:

| Water | 96.00% |
|---|---|
| Calcium carbonate | 0.75 |
| Citric acid | 3.25 |
| | 100.00% |

The pieces so formed are rinsed with cold water and placed in a Wolverine Batch Jet Zone ™ fluidized bed drier. The drier is operated at a pressure differential of 4.5 in $H_2O$ and an air temperature of 220° F. The pieces are dried to a moisture content of about 19% in 45 minutes. Thereafter, the pieces having a hollow center feature is finish dried in a forced hot air convection drier at 220° F. for one hour to an $A_w$ of 0.30.

The simulated dried fruit pieces so prepared are brittle, have hollow centers and have a density of about 0.2 g./cc. The tasty pieces are especially suitable for incorporation with R-T-E cereals.

EXAMPLE 2

Dried, simulated fruit pieces of the present invention having a chewy texture are prepared according to the following pilot plant procedure.

A 50 lb. (22.72 kg.) batch of encapsulant solution is prepared having the following formulation:

| Ingredient | Weight % |
|---|---|
| Distilled water | 40.00 |
| Strawberry puree (90% moisture) | 30.00 |
| Glycerol | 25.70 |
| Sucrose | 2.50 |
| Sodium alginate | 1.50 |
| Tetra sodium pyrophosphate | 0.30 |
| | 100.00% |

The solution is admixed in a high speed paddle mixer and pumped with a positive displacement pump through a nozzle submerged in a bath containing:

| Water | 98.00% |
|---|---|
| Calcium lactate | 2.00 |
| | 100.00% |

The nozzle is equipped with a cutting knife flush against the face of the nozzle die. Elongated pieces are formed being 10 mm. in diameter and 20 mm. in length. The pieces are kept in the bath for 15 minutes to encapsulate the solution. The pieces so formed are rinsed with cold water and placed in a forced hot air convection drier. The drier temperature is 220° F. The pieces are dried to an $A_w$ of 0.25 in about 4.5 hours.

The simulated dried fruit pieces so formed have a moisture content of about 8%, a hollow core region and a density of about 0.35 g./cc. and have a chewy texture. The pieces are useful as a shelf stable snack per se.

EXAMPLE 3

Dried, simulated peach flavored fruit pieces of the present invention having chewy texture are prepared according to the following bench scale procedure.

453.71 Grams of an encapsulant solution is prepared having the following formulation:

| Ingredient | Amount |
|---|---|
| Peach concentrate (68% moisture) | 24.06 g. |
| Orange pulp | 36.32 |
| Distilled water | 107.40 |
| High fructose corn syrup | 222.00 |
| Sucrose | 27.24 |
| Sodium alginate | 5.67 |
| Sodium pyrophosphate | 1.34 |
| Soybean oil | 27.24 |
| Polysorbate 60 | 2.27 |
| Flavor | 0.12 |
| Yellow dye | 0.05 |
| | 453.71 g. |

The solution is prepared and formed in spherical pieces as in Example 1 except that the gelling agent bath comprises:

| | |
|---|---|
| Water | 93.00% |
| Calcium carbonate | 0.75 |
| Citric acid | 6.25 |
| | 100.00% |

The pieces are allowed to form a skin in the bath for 30 minutes. The pieces so formed are washed with cold water (60° F.) and dried in a Jet Zone ™ fluidized bed drier at an ΔP=6 in. H₂O, a temperature of 230° F. for 55 minutes to an $A_w=0.50$.

The dried fruit pieces so formed are hollow, having a density of about 0.38 g./cc. The pieces are especially useful for addition to higher density and $A_w$ cereals such as whole wheat flaked R-T-E cereals.

What is claimed is:

1. A method for preparing a dried, simulated hollow fruit product comprising in sequence the steps of:
   (A) contacting a solution with a bath to form encapsulated pieces, said solution comprising
      (1) about 40 to 70% moisture
      (2) about 1 to 6% sweeteners, and
      (3) about 0.5 to 2.0% hydrophilic colloid (wet basis) said bath containing a gel setting agent capable of causing the hydrophilic colloid to set up an encasement around said pieces; immediately thereafter,
   (B) first drying the pieces with forced convection drying with hot air at about 220° to 280° F. to a moisture content of less than about 20%, to form hollow cored pieces; and
   (C) finish drying the hollow cored fruit pieces to a moisture content of about 5 to 10% to form a hollow centered dried simulated fruit piece having a density of about 0.15 to 0.40 g./cc.

2. The method of claim 1 wherein the hydrophilic colloid is selected from the group consisting of sodium alginate, low methoxyl pectin, iota carrageenan, kappa carrageenan, and mixtures thereof and wherein the gel setting agent is a water soluble calcium salt.

3. The method of claim 2 wherein the solution additionally comprises about 1 to 50% of a member selected from the group consisting of coloring agents, mold inhibitors, thickeners, flavors, intensifiers, plasticizers, fruit puree, fruit pulp, fruit juice, peanut butter, vegetable puree and cheese.

4. The method of claim 3 wherein the bath contains about 0.1 to 10% of an edible organic acid.

5. The method of claim 4 wherein the contacting step comprises extruding the encapsulant solution from an orifice submerged in the bath.

6. The method of claim 5 wherein the hot air has a downward vector relative to the fruit pieces and wherein the hot air is turbulent.

7. The method of claim 5 wherein the solution comprises 5% to 7% of an edible fatty triglyceride oil and about 0.1% to 6% of a food grade emulsifier.

8. A puffed, simulated fruit product comprising fruit flavored pieces
   (1) wherein the pieces range from about 1 to 25 mm. in diameter,
   (2) wherein the pieces comprise a shell having an inner hollow core comprising from about 35 to 65% of the volume of the pieces,
   (3) wherein the pieces have a water activity of about 0.2 to 0.6,
   (4) wherein the pieces have a density of about 0.15 to 0.40 g./cc., and
   (5) wherein the pieces are comprised of a gel based on hydrophilic colloid set with a gelling agent.

9. The product of claim 8 wherein the water activity is about 0.2 to 0.3.

10. The product of claim 9 wherein the shell is about 1 mm. in thickness and the core is about 6 to 10 mm. in size.

11. The product of claim 10 wherein the density ranges from about 0.15 to 0.25 g./cc.

12. A ready-to-eat puffed cereal containing simulated fruit pieces, comprising:
   (A) from about 99% to 50% by weight of the cereal of cereal pieces, said cereal pieces having
      (1) a density of about 0.15 to 0.40 g/.cc., and
      (2) a water activity of about 0.1 to 0.5; and
   (B) about 1% to 50% by weight of the cereal of puffed, dried simulated fruit pieces,
      (1) wherein the fruit pieces range from about 4 to 12 mm. in diameter,
      (2) wherein the fruit pieces having an inner hollow core comprising from about 35 to 65% of the volume of the fruit pieces,
      (3) wherein the fruit pieces have a water activity of about 0.2 to 0.5,
      (4) wherein the fruit pieces have a density of about 0.15 to 0.40 g./cc.; and
      (5) wherein the fruit pieces are comprised of a gel based on hydrophilic colloid set with a gelling agent.

13. The ready-to-eat cereal of claim 12 wherein the cereal pieces are puffed and have a density of about 0.15 to 0.25 g./cc. and a water activity of about 0.1 to 0.3.

14. The ready-to-eat cereal of claim 13 wherein the fruit pieces range from about 8 to 12 mm. in diameter.

15. The ready-to-eat cereal of claim 14 wherein the fruit pieces have a water activity of about 0.1 to 0.3.

16. The ready-to-eat cereal of claim 15 wherein the fruit pieces have a density of about 0.15 to 0.25.

* * * * *